UNITED STATES PATENT OFFICE.

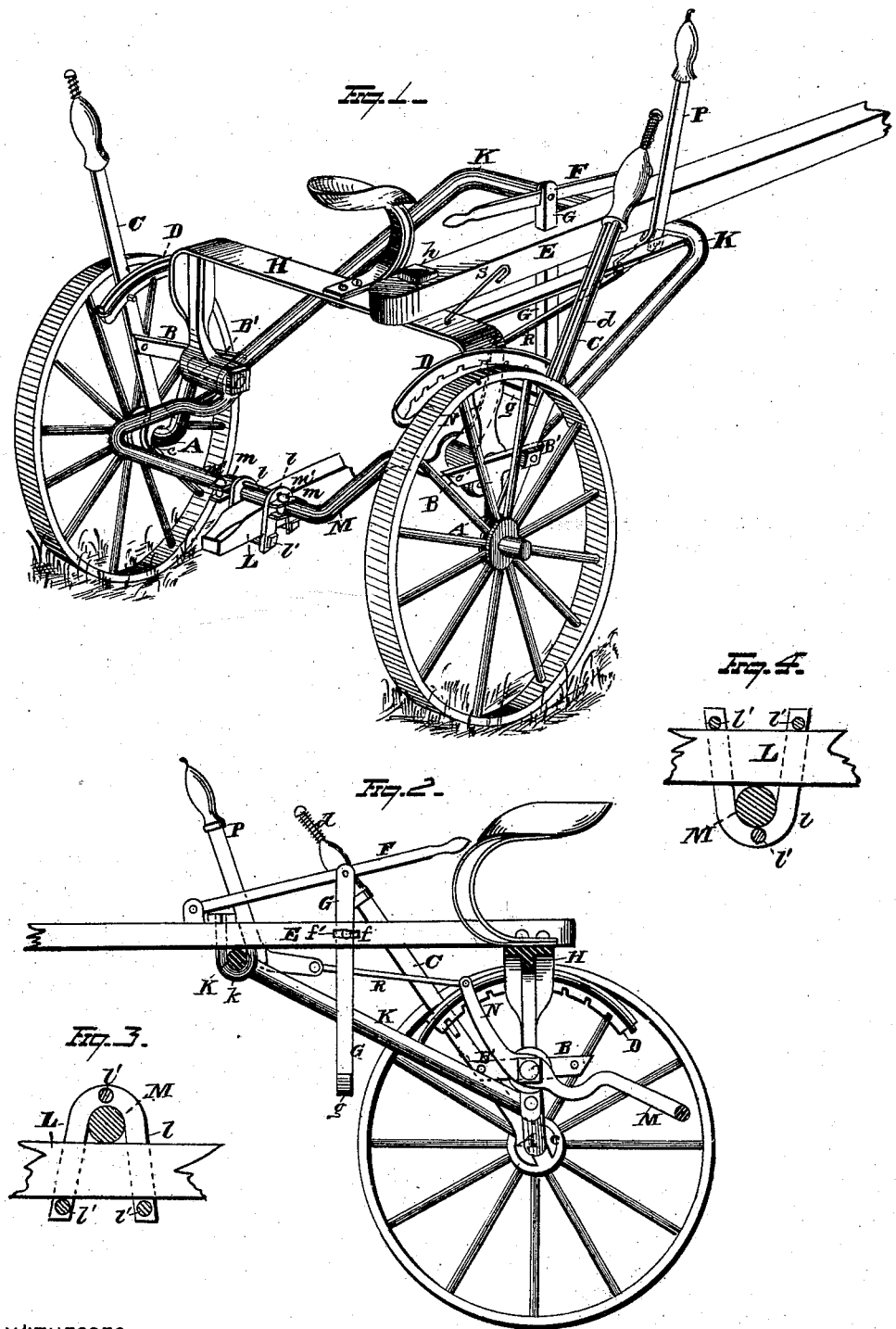

CHAUNCY G. PRICE AND JAMES M. MERRITT, OF TAMA COUNTY, IOWA.

IMPROVEMENT IN SULKY-PLOWS.

Specification forming part of Letters Patent No. 209,512, dated October 29, 1878; application filed February 28, 1878.

*To all whom it may concern:*

Be it known that we, CHAUNCY G. PRICE and JAMES M. MERRITT, of the county of Tama and State of Iowa, have invented certain new and useful Improvements in Sulky-Plows; and we do hereby declare the following to be a full, clear, and exact description of the invention, such as will enable others skilled in the art to which it pertains to make and use it, reference being had to the accompanying drawings, which form part of this specification.

Our invention relates to improvements in sulky-plows; and consists in a construction as follows: Each of the wheels is adapted to be adjusted forward or rearward by means of short crank-axles, respectively, having two right-angular arms in line with each other, formed on opposite sides of the axle-bodies near to their journal-bearing with the sulky-frame, the free outer extremities of said arms being adapted to be readily engaged by bolt-connection with upright levers, which latter respectively have their lower extremities bifurcated, so as to partially embrace the crank-axles and to be fulcrumed thereon; said levers being provided with spring-ratchets, which engage with segmental racks secured to the respective sides of the frame. The plow-beam is secured either above or below the bail by means of a clamp made with two curved side pieces, which are transversely connected together by bolts or tie-rods at end and central portions thereof, the plow-beam being held between the bail and the two tie-bolts, which connect the end portions of the said curved side pieces with each other. A collar partially embraces the bail on both sides of the clamp, so as to give lateral bearing to the same, said collars provided with tie-bolts, which bind them adjustably upon the bail by connecting together the free extremities of each of them.

Referring to the drawings, Figure 1 is a perspective view. Fig. 2 is an inner-side elevation. Fig. 3 is a detached view, showing the plow-beam clamped below the bail. Fig. 4 is a similar view, showing the plow-beam clamped above the bail.

The two crank-axles A are respectively made with the two arms B B', formed in line with each other, right-angularly on opposite sides of the axle-bodies near their journal-bearing with the sulky-frame. These arms engage with the upright levers C by means of suitable bolt-connections. The levers have bifurcated lower extremities, $c$, which partially embrace the axle-spindles, and adapt the levers to be fulcrumed thereon, so as to be moved forward or backward, as required, when in connection respectively with the arms B and B'.

The segmental racks D, secured to the sides of the frame, are adapted to permit the engagement therewith of the spring-ratchets $d$, which latter are formed on the upright levers and lock them in position. By changing the engagement of each of the levers with the respective arms of the axles, so that the lever which formerly was bolted to the end extremity B may be engaged with end B', and the lever which connected with end B' may be bolted to end B, the sulky will be adapted for use with its wheels just reversed as regards their relative position in a transverse plane. This enables the sulky to have its furrow-wheel run in advance of its land-wheel, whether a right or left hand plow is in use; and also it allows either side to be raised or lowered, in order to compensate for natural tipping or unevenness of the sulky in plowing on side hills and similar uneven ground.

The sulky-tongue E is provided with the lever F, fulcrumed forwardly thereon, and which extends rearwardly and engages by suitable bolt-connection with the shaft G, which latter has vertical adjustment in a vertical slot made in the tongue. The rear end of the lever has a handle, which is within reach of the driver, while the shaft is maintained in desired vertical adjustment by pin $f$, which works in the horizontal transverse slot $f'$ made in the tongue, and engages with the vertical side of the said shaft.

The lower extremity of the shaft is made with a cross-piece, $g$, adapted to have free bearing upon the forward end of the plow-beam, and by this means to regulate the depth of furrow. The tongue is moved to either side of the sulky, to correspond with the change required in using a right or left hand plow in substitution of each other, by bolt-connection $h$, with the arched frame H, which latter connects the two crank-axles together, and a hook-bolt, $k$, which engages with the front frame K. This change of tongue not only brings the draft of the plow into proper line, but also carries parts into position, so that the forward end of the plow-beam may be vertically adjusted, as set forth.

The clamp, which secures the plow-beam L to the bail M, consists of the two curved side pieces $l$, having their respective central and end portions transversely connected together by tie bolts or rods $l'$. A plow-beam of any width may be secured to the bail by this clamp, and either above or below the same, the plow-beam being held between the bail and the two bolts which transversely connect the end portions of the curved side pieces.

Collars $m$ prevent lateral movement of the clamp, partially embracing the bail, and bound upon the latter by short tie-bolts $m'$, which connect together the extremities of each of the collars. As either a right or left hand plow is used interchangeably, this clamp is moved to the corresponding side of the sulky, collars $m$ being first suitably loosened upon the bail, and then moved longitudinally thereon, after which they are again tightened, so as to firmly hold the clamp between them. Both sides of this bail have pivotal bearing, respectively, upon the two crank-axles. One of said sides is made with a forward and upwardly projecting extension, N, which engages with the upright bell-crank lever P by the intermediate link R. This lever is maintained in horizontal position, so as to hold the plow supported above the ground by the catch-piece S, which is secured to the arched frame connecting the crank-axles.

The construction thus described constitutes our invention; and we desire to be understood as laying claim to the same, and not, broadly, to the several results attained thereby. Other sulky-plows have adjusted the wheels forward and rearward, have regulated the depth of furrow by vertical bearing upon the plow-beam, and have raised the plow from the ground; but our improvements consist in the different construction from the sulky-plows heretofore made in the several particulars as set forth in the claims.

Having fully described our invention, what we claim as new, and desire to secure by Letters Patent, is—

1. The combination, with a crank-axle made with the two right-angular arms formed thereon, of the lever which is fulcrumed on the axle-spindle and adapted to engage respectively with the outer extremities of said arms by suitable bolt-connection, substantially as set forth.

2. The combination, with a crank-axle provided with the two arms formed right-angularly on opposite sides thereof, of the lever fulcrumed on the axle-spindle, and adapted to be engaged by bolt-connection with either one of the arms, said lever being made with the spring-ratchet, which engages with the segmental rack, substantially as set forth.

3. The combination, with a crank-axle made with the two right-angular arms projecting respectively from opposite sides thereof, of the lever adapted to engage with the outer extremities of the arms, said lever being made with a bifurcated lower end, which loosely embraces the axle-spindle, and adapts the lever to be operated when connected respectively with either one of said angular arms, substantially as set forth.

4. The adjustable clamp composed of the U-shaped side pieces $l$ and tie-rods $l'$, in combination with a plow-beam and bail and clamping-collars, whereby any width of beam may be secured either above or below the bail, substantially as set forth.

In testimony that we claim the foregoing we have hereunto set our hands this 21st day of February, 1878.

CHAUNCY G. PRICE.
JAMES M. MERRITT.

Witnesses:
FRED. CHRISTEN,
J. E. FRICK.